(Model.)
J. FULLER, Sr.
GAGE ATTACHMENT FOR BORING BITS, &c.
No. 294,985. Patented Mar. 11, 1884.
Fig. 1.
Fig. 3.
Fig. 2.
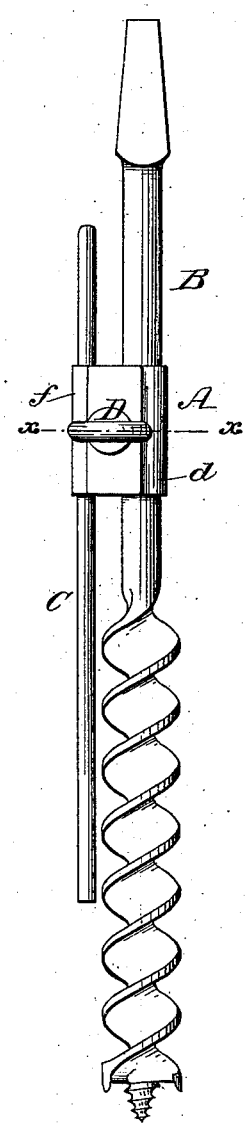
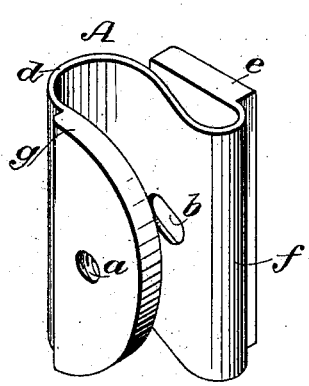
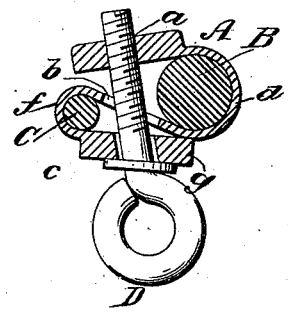
WITNESSES:
INVENTOR:
J. Fuller, Sr.
BY Munn & Co
ATTORNEYS.

UNITED STATES PATENT OFFICE.

JOHN FULLER, SR., OF SENECA, KANSAS.

GAGE ATTACHMENT FOR BORING-BITS, &c.

SPECIFICATION forming part of Letters Patent No. 294,985, dated March 11, 1884.

Application filed August 15, 1883. (Model.)

*To all whom it may concern:*

Be it known that I, JOHN FULLER, Sr., of Seneca, in the county of Nemaha and State of Kansas, have invented a new and Improved Gage Attachment for Boring-Bits, &c., of which the following is a full, clear, and exact description.

This invention consists of a clamp adapted to be placed upon the shank of a bit, auger, or other boring-tool, the clamp being constructed to hold a gage-bar in such manner that it will stop the progress of the boring-tool when the hole being bored shall have reached the required depth.

Reference is to be had to the accompanying drawings, forming part of this specification, in which similar letters of reference indicate corresponding parts in all the figures.

Figure 1 is a front elevation of a boring-bit, showing my gage attachment applied thereto. Fig. 2 is a sectional plan view of the same, taken on the line $x\ x$ of Fig. 1; and Fig. 3 is a perspective view of the clamp-plate.

A represents the clamp. This is, by preference, made of a sheet of steel having the three holes $a\ b\ c$ made through it, one being made near each end and one in the middle. In forming the clamp, the plate is then bent first to form the loop $d$, that clamps the shank of the boring-tool B, and is then reversed or turned in the opposite direction, to form the smaller loop $f$, that receives and holds in position the gage-bar C. By preference the clamp A is thickened or re-enforced at its ends, as shown at $e\ g$, and the hole $a$ is screw-threaded to receive the screw-threaded end of the thumb-screw D, which passes through the holes $c\ b$ between the loops $d\ f$ and screws into the holes $a$, thus enabling the ends of the clamp A to be drawn together by the thumb-screw for securing the clamp upon the boring-tool B, and at the same time causing the clamp to grasp the gage-bar C, as will be understood from Fig. 2.

By removing the thumb-screw D the clamp may be easily removed from the loop B, and by loosening the screw D the clamp may be moved up or down upon the tool B, or the gage-bar C may be moved up or down in the loop $f$, as desired, according to the depth of the hole desired to be bored.

In use the device will be placed upon the shank of the boring-tool, as shown in Figs. 1 and 2, and the bar C will then be adjusted so that its lower end will stand the proper distance from the cutting end of the tool, which will mark the depth of the hole. The tool B will then be used for boring in the ordinary way until the lower end of the bar C reaches the object being bored, which will stop the progress of the tool always at the desired depth.

I do not abandon or dedicate to the public any patentable feature set forth herein and not hereinafter claimed, but reserve the right to claim the same, either in a reissue of any patent that may be granted upon the application or in other applications for Letters Patent that I may make.

Having thus described my invention, what I claim as new, and desire to secure by Letters Patent, is—

1. In a gage for augers, the clamp A, bent to form the loops $d$ and $f$, and thickened or re-enforced at its ends, substantially as and for the purposes set forth.

2. In a gage for augers, the clamp-plate A, bent to form the loops $d$ and $f$, re-enforced at its ends and formed with the holes $a\ b\ c$, in combination with the screw D and bar C, arranged to operate substantially as set forth.

JOHN FULLER, SR.

Witnesses:
REUBEN C. BASSETT,
J. E. TAYLOR.